United States Patent [19]
Dunagan

[11] Patent Number: 6,060,103
[45] Date of Patent: May 9, 2000

[54] METHOD FOR EXTENDING THE SHELF LIFE OF A CARBONATED BEVERAGE WITHIN A PLASTIC BOTTLE BY MAINTAINING A LOW FILL TEMPERATURE

[75] Inventor: John C. Dunagan, Fairfield, Conn.

[73] Assignee: Plastic Technologies, Inc., Holland, Ohio

[21] Appl. No.: 08/669,103

[22] Filed: Jun. 24, 1996

[51] Int. Cl.$^7$ ..................................... A23B 55/00
[52] U.S. Cl. ......................... 426/397; 426/329; 426/590; 426/599; 426/600
[58] Field of Search ..................... 528/481, 309, 528/503, 288; 62/389; 426/324, 398, 127, 590, 599, 477, 397, 391; 428/35, 36, 50, 542.8, 910, 476.9, 480, 481; 99/275, 323, 323.1; D7/601, 602; 53/403, 467, 473, 79, 432, 32

[56] References Cited

U.S. PATENT DOCUMENTS

| | | | |
|---|---|---|---|
| 3,751,872 | 8/1973 | Helms | 53/32 |
| 4,223,128 | 9/1980 | Halek et al. . | |
| 4,342,399 | 8/1982 | Stirling . | |
| 4,347,695 | 9/1982 | Zobel et al. . | |
| 4,435,453 | 3/1984 | Vieth et al. | 428/35 |
| 4,482,587 | 11/1984 | Fagerburg et al. | 428/35 |
| 4,804,552 | 2/1989 | Ahmed et al. | 426/580 |
| 5,324,528 | 6/1994 | Wright et al. | 426/324 |

*Primary Examiner*—Donna Wortman
*Attorney, Agent, or Firm*—Donald R. Fraser

[57] ABSTRACT

A process for extending the shelf life of a carbonated beverage within a plastic bottle comprises placing the carbonated beverage in the plastic bottle at a temperature less than about 72° F., maintaining the temperature of the carbonated beverage at less than about 72° F. for a time sufficient to convey the plastic bottle to an unrefrigerated, insulated container, and inserting the plastic bottle into the container.

13 Claims, No Drawings

6,060,103

METHOD FOR EXTENDING THE SHELF LIFE OF A CARBONATED BEVERAGE WITHIN A PLASTIC BOTTLE BY MAINTAINING A LOW FILL TEMPERATURE

FIELD OF THE INVENTION

This invention relates generally to a method for extending the shelf life of a carbonated beverage contained within a plastic bottle, by maintaining a low fill temperature. More particularly, the invention is directed to a process for reducing the migration of the carbon dioxide that is dissolved in a carbonated beverage out through the walls of a plastic bottle, by insulating the plastic bottle immediately after filling the plastic bottle with a cold carbonated beverage.

BACKGROUND OF THE INVENTION

It is well-known in the art that thermoplastic bottles can be used to contain carbonated liquids for consumer use. For example, soft drinks, sparkling water, beer, etc. are currently packaged in polyethylene terephthalate bottles for distribution and retail sale to the general public.

A problem encountered when using plastic bottles, however, is the loss of carbonation from the packaged beverage over time due to migration of the dissolved carbon dioxide through the bottle wall to the external atmosphere. This loss of carbonation from the beverage, generally referred to as the beverage "going flat", is unacceptable to consumers. In this regard, acceptable carbonation levels for most beverages range from about 2 to about 5 volumes of dissolved carbon dioxide. It is generally agreed that carbonated soft drinks are deemed to be "flat" when the carbon dioxide level drops below about 3.4 volumes of dissolved gas. Regarding the pressure at which the carbonation is maintained within modern plastic bottles, the autogenous pressure may range up to about 100 psi; approximately the highest pressure typically found within a plastic bottle containing a carbonated soft drink.

U.S. Pat. No. 4,342,399 to Stirling discloses a composite bottle, comprising a tubular carbon dioxide-impermeable jacket covering a substantial portion of the body of a carbon dioxide-permeable plastic bottle. This construction is said to reduce the migration of carbon dioxide through the bottle wall, and thus increase the shelf life of the carbonated beverage. The disclosed composite bottle does not, however, reduce the migration of carbon dioxide through those bottle wall portions which are not covered by the impermeable jacket. Moreover, the addition of the impermeable jacket greatly increases the cost, manufacturing complexity, and weight of the resultant composite bottle.

It would be desirable to develop a process for extending the shelf life of a carbonated beverage within a plastic bottle, by reducing the migration of carbon dioxide out through the bottle wall, which process does not comprise modifying the plastic bottle.

SUMMARY OF THE INVENTION

Accordant with the present invention, a process for extending the shelf life of a carbonated beverage within a plastic bottle surprisingly has been discovered. The process comprises the steps of:

placing a carbonated beverage into a plastic bottle, the carbonated beverage having a temperature less than about 72° F.;

maintaining the temperature of the carbonated beverage within the plastic bottle at less than about 72° F. for a period of time sufficient to convey the plastic bottle to, and insert the plastic bottle in an unrefrigerated, insulated container; and inserting the plastic bottle into the unrefrigerated, insulated container.

The process of the present invention is particularly useful for extending the shelf life of carbonated soft drinks contained in polyethylene terephthalate bottles.

DETAILED DESCRIPTION OF THE PREFERRED EMBODIMENTS

Existing methods for manufacturing plastic beverage containers are well established. Thus, plastic bottles which have achieved wide consumer acceptance are well-known in the beverage industry. Much capital has heretofore been invested to establish industry standards for both the plastic bottles and the methods for manufacturing and filling same with carbonated beverages. Accordingly, the present invention is directed to a process for extending the shelf life of a carbonated beverage within a standard, well-known plastic bottle, which process does not include any modification to the plastic bottle.

The normal shelf life of a carbonated beverage within a 20 ounce straight-walled plastic bottle ranges from about 8 to about 11 weeks. The process of the present invention can economically extend this normal shelf life by up to about four additional weeks. As previously stated, the shelf life is that period of time after which the carbonated beverage becomes "flat" due to the migration of carbon dioxide out through the bottle wall. For many carbonated beverages, the shelf life is that period of time after which the carbon dioxide level reaches a value of about 3.4 volumes of dissolved carbon dioxide.

Those beverages for which the inventive process is useful include, but are not necessarily limited to, soft drinks, carbonated fruit juices, sparkling waters, sodas, beers, and the like.

Suitable plastic bottles for use according to the present invention are well-known, and may be prepared from plastics including, but not necessarily limited to, polyethylene terephthalate, acrylonitrile/ethylene/methyl acrylate copolymer, acrylonitrile/styrene/methyl acrylate copolymer, methacrylonitrile copolymers, polycarbonates, polysulfones, and the like. A preferred plastic is polyethylene terephthalate, which additionally may contain minor amounts of ester forming compounds and copolymers of ethylene terephthalate. Moreover, the plastics listed hereinabove may include adjuvants such as, for example, stabilizers, extrusion aids, additives which make the plastic more degradable, dyes, pigments, etc., as well as combinations thereof.

Typically, the plastic bottles have fluid capacities from about 6 to about 96 fluid ounces and wall thicknesses from about 8 mils to about 60 mils. The wall thicknesses may vary over wide limits to meet the specific pressure demands for the carbonated beverage contained therein. The pressure within a carbonated beverage bottle may range up to about 100 psi, but typically is in the range of about 60 psi. Such bottles, as well as methods for manufacturing, filling, and sealing same, are well-known in the industry.

According to the inventive process, a carbonated beverage having a reduced temperature is placed within a plastic bottle utilizing conventional bottling techniques. Thereafter, the temperature of the carbonated beverage within the plastic bottle is maintained at the reduced temperature for a period of time sufficient to convey the plastic bottle to, and prepare the plastic bottle for, packaging into a container. Finally, the plastic bottle is inserted into an unrefrigerated, insulated container for storage or shipping to a retail sales outlet.

The temperature at which the carbonated beverage is placed into the plastic bottle is important to the process of the present invention. It must be low enough that the plastic bottle and carbonated beverage therein will maintain a temperature within an unrefrigerated, insulated container lower than the ambient temperature surrounding the container for a substantial period of time. Thus, the temperature at which the carbonated beverage is placed in the plastic bottle must be below about 72° F. Preferably, the temperature is below about 45° F.

Thereafter, the temperature of the carbonated beverage within the plastic bottle is maintained at a temperature below about 72° F., preferably below about 45° F., for a period of time sufficient to convey the plastic bottle to a packaging station and to prepare the plastic bottle for packaging. The length of time required may be very short; on the order of several seconds in the case where the plastic bottle containing the cold carbonated beverage is placed into an unrefrigerated, insulated container immediately after filling. The period of time conversely may be much longer; on the order of at least several minutes in the case where the plastic bottle must be conveyed to a remote location for packaging, or where several plastic bottles must be accumulated in one location prior to insertion of a large number of plastic bottles into a singular unrefrigerated, insulated container.

In all cases, during the aforementioned period of time, the temperature of the carbonated beverage within the plastic bottle must be maintained at less than about 72° F., preferably at less than about 45° F. This may be achieved in any one of several ways. For example, the plastic bottle containing the cold carbonated beverage may be conveyed immediately from the filling apparatus and inserted, within a matter of several seconds, into an adjacent unrefrigerated, insulated container. Thus, the temperature of the carbonated beverage within the plastic bottle will not have had sufficient time to rise to the ambient temperature as a result of the bottle's contact with the atmosphere. Alternatively, the plastic bottle having the cold carbonated beverage therein may be conveyed through, and/or stored in, a refrigerated chamber for up to several hours, before being inserted into the unrefrigerated, insulated container. Thus, during this process step of maintaining the temperature of the carbonated beverage below the ambient temperature, the present invention contemplates cooling the bottled carbonated beverage to a temperature below the bottling temperature by conventional refrigeration techniques.

Finally, the plastic bottle containing the cold carbonated beverage is inserted into an unrefrigerated, insulated container. In a preferred embodiment of the present invention, a plurality of plastic bottles containing the cold carbonated beverage is inserted into a singular unrefrigerated, insulated container. For example, an entire pallet load of plastic bottles may be processed in this fashion in preparation for storage or shipment to a retail sales outlet.

The insulated container may be any conventional device useful for holding one or more plastic bottles. Examples of containers include, but are not necessarily limited to, metal, plastic, cardboard, or fiberglass boxes, or rubber, plastic, or metal foil bags, or plastic wraps, and the like. As will be readily apparent to those ordinarily skilled in the art, such containers may be insulated in a conventional manner such as, for example, by lining or filling the containers with insulating materials including, but not necessarily limited to, glass fibers, paper, styrenic or urethane foam boards or beads, and the like. Insulated containers useful for holding one or many plastic bottles are well-known in the art, and need not be described further herein. Thus, the plastic bottle or bottles are substantially surrounded by insulation in a manner that will prevent the rapid warming of the carbonated beverage within. The insulated container is unrefrigerated in the conventional sense; meaning that the container has no mechanical or electrical device for extracting heat energy from the insulated container or its contents.

As will be readily apparent to those ordinarily skilled in the art, an important requirement of the inventive process is that the carbonated beverage be maintained at a temperature below about 72° F., preferably below about 45° F., during the entire period of time between when it is first placed within the plastic bottle and when the plastic bottle is inserted into the unrefrigerated, insulated container. If the carbonated beverage is allowed to warm above ambient temperature, the shelf life of the product could be adversely affected.

The rate of migration of carbon dioxide from the carbonated beverage out through the plastic bottle wall is at least partially based upon the temperature at which such migration occurs. Colder temperatures result in slower migration of carbon dioxide. Thus, the present invention is directed to a process for maintaining the temperature of the carbonated beverage as low as reasonably possible for a period of time as long as economically possible. Accordingly, the present invention does not require the refrigeration of the carbonated beverage.

Carbonated beverages are generally placed into plastic bottles at a low temperature (as low as 38° F. in some instances) to suppress foaming during the filling operation. The inventive process maintains this low temperature through a system of insulated secondary containment to delay the warming of the carbonated beverage and reduce the migration of carbon dioxide through the plastic bottle sidewall.

EXAMPLE

A carbonated beverage is placed into a plurality of first polyethylene terephthalate bottles at a temperature of about 38° F. The bottles are maintained at a temperature of about 38° F. while they are assembled and placed into a pallet-sized unrefrigerated, insulated container.

Identical carbonated beverage is likewise placed into a plurality of second polyethylene terephthalate bottles at a temperature of about 38° F. These bottles are allowed to attain room temperature by exposure to the atmosphere.

It is observed that the carbonated beverage within the first polyethylene terephthalate bottles goes "flat" (i.e., reaches a carbonation level of about 3.4 volumes of carbon dioxide) after about 81 days, while the carbonated beverage within the second polyethylene terephthalate bottles experiences the same carbon dioxide loss in only about 56 days. Thus, the shelf life of the carbonated beverage in the first polyethylene terephthalate bottles is extended by about 25 days. It is also observed that the temperature of the carbonated beverage in the first polyethylene terephthalate bottles remains below ambient temperature within the unrefrigerated, insulated container for about four weeks.

This Example may be repeated with similar success by substituting the generically or specifically described materials and parameters recited herein for those used in the preceding Example.

The process for extending the shelf life of a carbonated beverage within a plastic bottle according to the present invention described hereinabove is generally disclosed in terms of its broadest application to the present invention. Occasionally, however, the described process conditions or materials may not be precisely applicable to each carbonated beverage and plastic bottle combination included within the disclosed scope. Those instances where this occurs will be readily recognized by those ordinarily skilled in the art. In all such cases, the process may successfully be performed by routine modifications to the disclosed process, eg, colder temperatures may be used, bottles prepared from other plastics may be employed, etc., or other modifications which are otherwise conventional may be effected.

The invention is more easily comprehended by reference to the specific embodiments recited hereinabove which are representative of the invention. It must be understood, however, that the specific embodiments are provided only for the purpose of illustration, and that the invention may be practiced otherwise than as speciafically illustrated without departing from its spirit and scope.

What is claimed is:

1. A process for extending the shelf life of a carbonated beverage within a plastic bottle, comprising the steps of:
   placing a carbonated beverage into a plastic bottle, said carbonated beverage having a temperature less than about 72° F.;
   maintaining the temperature of the carbonated beverage within the plastic bottle at less than about 72° F. for a period of time sufficient to convey the plastic bottle to; and insert the plastic bottle in, an unrefrigerated, insulated container; and
   inserting the plastic bottle into the unrefrigerated, insulated container.

2. The process for extending the shelf life of a carbonated beverage placed into the plastic bottle within a plastic bottle according to claim 1, wherein the temperature of the carbonated beverage is less than about 45° F.

3. The process for extending the shelf life of a carbonated beverage within a plastic bottle according to claim 1, wherein the carbonated beverage within the plastic bottle is maintained at a temperature less than about 45° F.

4. The process for extending the shelf life of a carbonated beverage within a plastic bottle according to claim 1, wherein the carbonated beverage is selected from the group consisting of soft drinks, carbonated fruit juices, sparkling waters, sodas, and beers.

5. The process for extending the shelf life of a carbonated beverage within a plastic bottle according to claim 1, wherein the plastic is selected from the group consisting of polyethylene terephthalate, acrylonitrile/styrene/methyl acrylate copolymer, acrylonitrile/ethylene/methyl acrylate copolymer, methacrylonitrile copolymers, polycarbonates, and polysulfones.

6. The process for extending the shelf life of a carbonated beverage within a plastic bottle according to claim 5, wherein the plastic is polyethylene terephthalate.

7. The process for extending the shelf life of a carbonated beverage within a plastic bottle according to claim 1, wherein a plurality of plastic bottles is inserted into the unrefrigerated, insulated container.

8. The process for extending the shelf life of a carbonated beverage within a plastic bottle, comprising the steps of:
   placing a carbonated beverage, selected from the group consisting of soft drinks, carbonated fruit juices, sparkling waters, sodas, and beers, into a plurality of plastic bottles prepared from a plastic selected from the group consisting of polyethylene terephthalate, acrylonitrile/styrene/methyl acrylate copolymer, acrylonitrile/ethylene/methyl acrylate copolymer, methacrylonitrile copolymers, polycarbonates, and polysulfones, said carbonated beverage having a temperature less than about 72° F.;
   maintaining the temperature of the carbonated beverage within the plastic bottles at less than about 72°F. for a period of time sufficient to convey the plastic bottles to, and insert the plastic bottles in, an unrefrigerated, insulated container; and
   inserting the plastic bottles into the unrefrigerated, insulated container.

9. The process for extending the shelf life of a carbonated soft drink placed into the plastic bottles within a plastic bottle according to claim 8, wherein the temperature of the carbonated beverage is less than about 45° F.

10. The process for extending the shelf life of a carbonated beverage within a plastic bottle according to claim 8, wherein the carbonated beverage within the plastic bottle is maintained at a temperature less than about 45° F.

11. The process for extending the shelf life of a carbonated beverage within a plastic bottle according to claim 8, wherein the plastic is polyethylene terephthalate.

12. The process for extending the shelf life of a carbonated beverage within a plastic bottle according to claim 8, wherein the carbonated beverage is a carbonated soft drink.

13. A process for extending the shelf life of a carbonated soft drink within a polyethylene terephthalate bottle, comprising the steps of:
   placing a carbonated soft drink into a plurality of polyethylene terephthalate bottles, said carbonated soft drink having a temperature less than about 45° F.;
   maintaining the temperature of the carbonated soft drink within the polyethylene terephthalate bottles at less than about 45° F. for a period of time sufficient to convey the polyethylene terephthalate bottles to, and insert the polyethylene terephthalate bottles in, an unrefrigerated, insulated container; and
   inserting the polyethylene terephthalate bottles into the unrefrigerated, insulated container.

* * * * *